Figure 1:
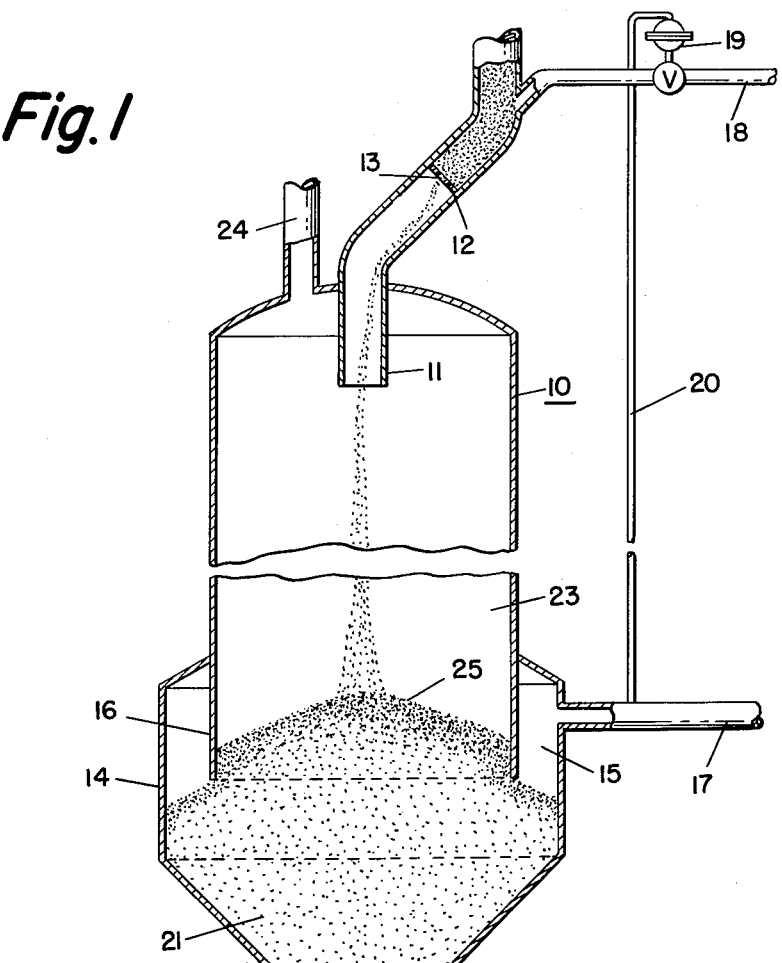

March 6, 1956   W. L. McCLURE   2,737,294
SURFACE LEVEL CONTROL IN A COMPACT SOLIDS BED
Filed Dec. 11, 1951   2 Sheets-Sheet 1

INVENTOR.
WILLIAM L. McCLURE
BY
Busser and Smith
ATTORNEYS

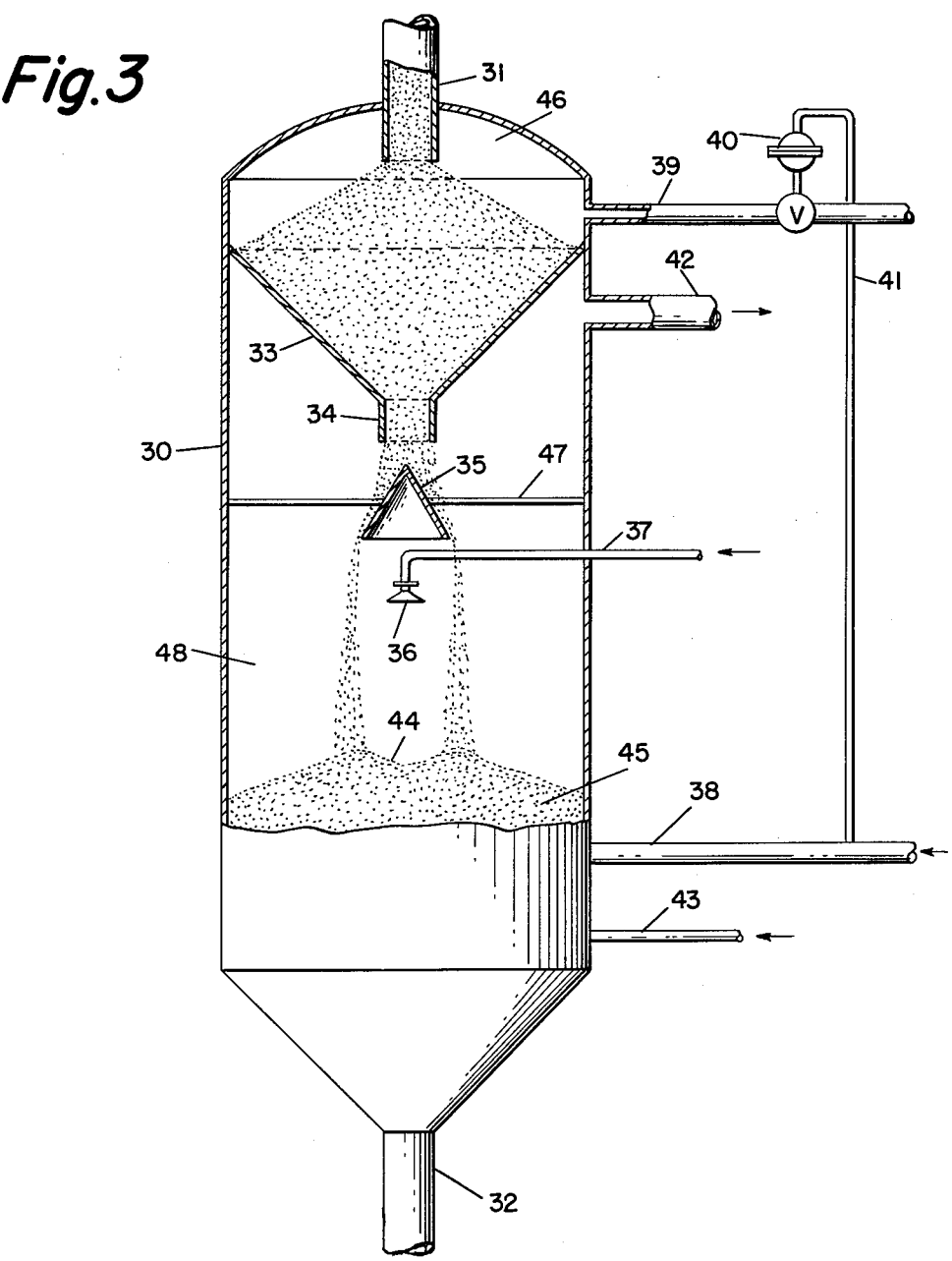

United States Patent Office 2,737,294
Patented Mar. 6, 1956

2,737,294

SURFACE LEVEL CONTROL IN A COMPACT SOLIDS BED

William L. McClure, Toledo, Ohio, assignor to Sun Oil Company, Philadelphia, Pa., a corporation of New Jersey Application December 11, 1951, Serial No. 261,046

8 Claims. (Cl. 209—138)

This invention relates to method and apparatus for automatically controlling the level of the upper surface of a moving compact bed of granular solids.

In many commercial processes it is known to gravitate granular solids as a compact mass through a vessel. Common industrial applications of such operations are to be found in processes for conversion of hydrocarbon material involving contacting hydrocarbon material with a compact bed of granular conversion-supporting solids gravitating through a conversion zone. In such processes, relatively fine particles are commonly removed from the mixture of particles in the process system by introducing a small proportion of the solids in the system into an elutriating zone through which the granular solids pass downwardly as a falling stream of solids while a gas stream of controlled velocity is passed upwardly countercurrent to the falling solids and entrains the relatively fine particles in the mixture and carries them upwardly out of the elutriating zone while the relatively coarse particles in the mixture are collected on a compact bed at the bottom of the elutriating zone. The latter bed continuously gravitates through an outlet from the elutriating vessel and so constitutes a moving compact bed of the type contemplated by the present invention, i. e. a compact bed to the top of which granular solids are continuously supplied and from the bottom of which granular solids are continuously withdrawn.

The preceding discussion provides examples of instances where compact solids beds gravitate through vessels. In most or all of these examples it is important to control the level of the surface of the compact bed. It is disadvantageous for the upper surface of a moving compact bed to be either substantially higher or substantially lower than a certain optimum operating level. This is particularly true in instances where the solids which are fed to the upper surface of the moving compact bed previously fall through a space thereabove. In such instances it is disadvantageous for the surface of the moving bed to descend to a level substantially below the optimum level because such decrease in the height of the surface results in a greater distance through which solids must fall, and such greater distance of fall tends to result in excessive attrition of the solids upon striking the upper surface of the compact bed. Attrition is a phenomenon which is to be avoided in processes as herein contemplated since attrition results in excessively high rates of loss of solids from the system.

It is disadvantageous also for the upper surface of the moving compact bed to rise substantially beyond the optimum level because such rise tends to interfere with the physical action or chemical reaction which is effected in the zone through which the granular solids fall. For example, in a hydrocarbon conversion vessel wherein falling granular solids are contacted with hydrocarbon material, in order to effect conversion of the latter, the contacting of the hydrocarbon material with the granular solids is adversely affected if the compact bed rises so that its upper surface is substantially above the optimum level. And in an elutriation operation of the type which has been previously described, the entraining of relatively fine solids by the rising gas stream in the elutriator is adversely affected if the upper surface of the compact bed in the bottom of the elutriator rises substantially above the optimum level.

According to the present invention a method is provided for controlling the level of the upper surface of a moving compact bed of granular solids, to the top of which solids are continuously supplied from a freely falling stream and from the bottom of which solids are continuously withdrawn. Thus, according to the invention, if the level of the upper surface of such a compact bed rises to a substantial degree above the optimum level, the means by which granular solids are supplied to the top of the compact bed are automatically acted upon in such manner as to compensate for the rise in the surface level and to cause the surface level to fall again to the optimum level. On the other hand, if the surface level drops substantially below the optimum level the solids supply means are acted upon in such manner as to compensate for the drop in surface level and to cause the surface level to rise again to the optimum level.

Figure 2:
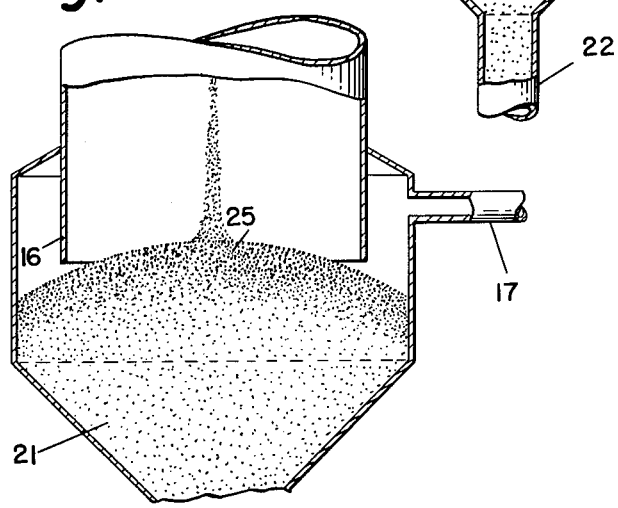

The invention will be further described with reference to the attached drawings. Figure 1 is in part a sectional elevational view of a vessel which can be employed according to the present invention, for example as an elutriating vessel, with control of the upper surface level of a compact bed gravitating through the bottom of the elutriating vessel, the control being effected with the aid of auxiliary apparatus as schematically represented in Figure 1. In Figure 2 a portion of the vessel illustrated in Figure 1 is shown with the surface level of the compact bed at a lower level than the level of the compact bed in Figure 1, a modified form of operation being possible with the surface level positioned as shown in Figure 2. In Figure 3 the invention is illustrated as applied to an arrangement suitable for converting hydrocarbon oil by contact with granular solid material, the surface level of the compact bed gravitating through the lower portion of the conversion vessel being controlled according to the present invention.

Turning now to Figure 1, there is illustrated therein a vessel 10 suitable for use as an elutriator. Extending through the top of vessel 10 is a conduit 11 within which is positioned a transverse plate 12 having a central aperture 13 therethrough, which aperture constitutes a restricted orifice. A lower expanded portion 14 of vessel 10 provides an annular space 15 between itself and the lower end of an upper portion 16 of vessel 10. Communicating with annular space 15 is a gas conduit 17. Communicating with conduit 11 at a level above the plate 12 is a gas conduit 18, which is also in communication with a diaphragm valve 19 which is adapted to regulate the rate of gas flow through conduit 18 in accordance with pressure transmitted from conduit 17 through line 20 to the diaphragm valve 19. The diaphragm valve 19 can be of any suitable type capable of decreasing the rate of gas flow through conduit 18 when the pressure in line 20 increases and capable of increasing the rate of gas flow through conduit 18 when the pressure in line 20 decreases. Any other type of pressure-responsive gas flow rate controller capable of performing this function can also be used. Diaphragm valves and other types of gas flow rate controllers capable of performing this function are well known in the art.

In operation granular solids are gravitated as a compact mass through an upper portion of conduit 11 and then through aperture 13 in plate 12 into a lower portion of conduit 11. The granular solids fall beneath plate 12 through the remaining length of conduit 11 and thence into the interior of vessel 10. The solids fall onto the upper surface 25 of compact bed 21, which gravitates through a lower portion of vessel 10 and which is removed therefrom through line 22. A stream of gas under elevated pressure from a source not shown, is passed through line 17 into annular space 15 and thence into compact bed 21 and upwardly therethrough past the surface 25 of compact bed 21 into the gas space 23. The gas passes upwardly countercurrent to the solids falling through the space 23 and selectively entrains the relatively fine solids in the falling solids stream and carries the entrained fine solids out of vessel 10 through line 24. The pressure in vessel 10 in the space above the bed 21 is maintained substantially constant by means not shown, e. g. pressure-regulating means in line 24. While the surface level 25 of compact bed 21 remains at a constant position, the gas supply through line 17 is maintained at a constant pressure, and the constant pressure in the conduit 17 is transmitted to the diaphragm in diaphragm valve 19 in order to maintain the setting of the valve 19 at a constant position, thereby maintaining the gas flow rate through conduit 18 constant. Gas is introduced through conduit 18 into conduit 11 and passes downwardly with the solids through that conduit and through the aperture 13 in the plate 12. Other conditions being constant, the rate of flow of gas through line 18 determines the rate at which granular solids pass through the orifice 13, and while the gas flow rate and other conditions are constant, the rate of solids flow through the orifice 13 remains constant.

However, when through some instability in the system a change in the positioning of the surface level 25 of the compact bed 21 occurs, for example when the surface level 25 rises, the rate of solids flow through aperture 13 is caused to be reduced so that the surface level 25 falls again to the desired normal position. This result is brought about in the following manner:

When the surface level 25 rises, the pressure drop undergone by gas in passing from annular space 15 through the compact bed 21 increases and consequently the pressure of gas in conduit 17 automatically increases because of the back pressure caused by the increased resistance. The increased pressure in line 17 increases the pressure in line 20 and causes the diaphragm in diaphragm valve 19 to be depressed and thereby to reduce the rate of gas flow through line 18. Thus the rate of gas flow through orifice 13 is reduced and it has been found that such reduction of the rate of gas flow decreases the rate at which solids flow through the orifice 13. The rate of solids introduction into vessel 10 having been decreased, the surface level 25 of compact bed 21 decreases until the desired normal position of the surface level 25 is restored and with it the equilibrium conditions in the pressure regulating system as above-described.

In an opposite manner based upon the same general principle of operation, a decrease in the surface level 25 causes a series of changes to be made in the pressure regulating system, which changes result in an increase in the rate of introduction of solids into vessel 10 so that the surface level 25 rises again to the desired normal position. This is accomplished by reduction of the pressure drop of gas passing through the bed 21 and consequent reduction of pressure in conduit 17, a rise in the diaphragm in diaphragm valve 19, increased gas flow rate through conduit 18 and increased solids rate through orifice 13.

In the operation described in connection with Figure 1 the pressure in line 17 is changed in accordance with the height of the bed level 25 since the gas from conduit 17 is required to pass through the compact bed 21. It is possible to obtain also a surface level control according to the present invention in a type of operation wherein the gas from conduit 17 is not required to pass through the compact bed 21, at least not when the surface level 25 of compact bed 21 is at the desired normal level. Referring to Figure 2, the bed level 25 is shown therein as being normally below the lower end of upper portion 16 of vessel 10. The bed level 25 is, however, close enough to the lower end of the member 16 to provide a passageway for gas between the surface 25 and the member 16 which is constricted enough to require the gas to undergo substantial pressure drop in flowing through that passageway. Thus when the bed level 25 falls for example, the passageway available for gas flow increases in area so that the pressure drop undergone by the gas is reduced and consequently the pressure in line 17 is reduced. As described in the discussion of Figure 1, reduction of pressure in line 17 results in increased solids flow into vessel 10 so that the bed level 25 is raised to the desired normal level. By the same principle, operating in an opposite fashion, an increase in the bed level 25 decreases the area of the passage available for gas flow and therefore increases the gas pressure drop with the result that the pressure in line 17 is increased and the solids flow rate into vessel 10 decreased in order to cause the bed level 25 to fall to the desired normal level.

In Figure 3 apparatus is illustrated for application of the present invention to an operation wherein hydrocarbon material is converted by contacting such material with granular solid contact material falling through a contacting zone. Conversion vessel 30 has an inlet 31 for granular solids and an outlet 32 for granular solids. Positioned within vessel 30 is a transverse partition 33 having a central aperture 34 therein which aperture constitutes a restricted orifice. Positioned beneath and coaxial with aperture 34 is a conical baffle 35 supported by supports 47. Beneath conical baffle 35 is an atomizer 36 adapted to spray liquid hydrocarbon material downwardly and laterally therefrom. Communicating with atomizer 36 is a conduit 37 which passes through the wall of the vessel 30 and is adapted to convey hydrocarbon material from outside vessel 30 into vessel 30 and into the atomizer 36. Communicating with a lower portion of vessel 30 is a gas conduit 38 which is adapted to deliver gaseous material to suitable distributing means not shown, which may be of any known type for distributing gaseous material within a compact gravitating bed of granular solids. Communicating with an upper portion of vessel 30 is a second gas conduit 39 which also communicates with a diaphragm valve 40. Similarly to the diaphragm valve illustrated in Figure 1, diaphragm valve 40 is adapted to control the rate of gas flow through conduit 39 in accordance with the pressure existing in conduit 38, the control being effected by pressure transmission through the line 41 which communicates with conduit 38 and with diaphragm valve 40. Vessel 30 has an outlet 42 for gaseous material and an inlet 43 for inert purging gas.

In operation granular solids are introduced through inlet 31 into vessel 30 and gravitate through the space above transverse baffle 33 as a compact mass. The granular solids then pass through aperture 34 and fall therebeneath over the upper surface of the conical baffle 35. The solids then fall beneath conical baffle 35 and are contacted with liquid hydrocarbon material which has been introduced through line 37 and sprayed downwardly and laterally from the atomizer 36. The solids then fall onto the upper surface 44 of compact bed 45 and the compact bed 45 gravitates through a lower portion of vessel 30 and is removed from vessel 30 through line 32. A gas stream is introduced through line 38 into compact bed 45 and passes upwardly therethrough and through the upper surface 44 of the bed 45. The pressure drop undergone by the gas in passing through the bed 45 is determined by the height of the bed surface 44 above the level of introduction of gas through conduit 38. This pressure drop determines the pressure existing in the line 38 which in turn determines the setting of the diaphragm valve 40 and the rate of gas flow through line 39 into the space 46 in an upper portion of the vessel 30. The rate of gas flow into the space 46 determines the pressure in that space which in turn determines the rate of solids flow through the aperture 34. In a manner generally similar to that described in connection with Figures 1 and 2, a change in the level of the bed surface 44 causes changes in the external pressure regulating system, which changes cause a change in the rate of solids flow through the aperture 34 in order to compensate for the change in level of the bed surface 44 and to cause the bed surface to be returned again to the desired normal position. Thus a rise in the level of the bed surface 44 causes the pressure in the space 46 to be decreased so that the rate of solids flow through the aperture 34 is decreased allowing the level of the bed surface 44 to fall again to the desired normal position. A depression, on the other hand, of the level of the bed surface 44 causes the pressure in the space 46 to increase so that the rate of solids flow through aperture 34 is increased causing the level of the bed surface 44 to rise again to the desired normal level.

Any suitable gas can be used for introduction through the line 38 and through the line 39. The gas can be inert relative to the granular solids in the system or it can be a gas capable of undergoing a reaction upon contact with the granular solids. Preferably, the gas introduced through line 39 is an inert gas, e. g. steam, since it is generally desired not to have a chemical reaction in the space above the transverse baffle 33. The gas introduced through line 38 can also advantageously be an inert gas such as steam or it can be, for example, hydrocarbon vapors capable of undergoing conversion upon contact with the granular solids in the system.

In the previously described operation the setting of a diaphragm valve is varied with changing pressure in a gas conduit. It is to be understood that if the variations of pressure in the gas conduit are not in themselves capable of effecting a large enough change in the setting of the diaphragm valve in order to obtain the desired result, any suitable pilot device can be used to augment the pressure variation and create an actuating pressure variation large enough to obtain the desired magnitude in the variations of setting in the diaphragm valve.

In Figures 1 and 2, instead of the single gas supply through line 17 to the space 23 for upward travel therein, a plurality of gas streams can be supplied to space 23 for upward travel therein. Any such stream additional to the stream supplied through line 17 can if desired be introduced in a manner such that the rate of introduction and the pressure drop undergone during introduction do not vary with the position of the surface level 25. Similarly in Figure 3, streams additional to the streams introduced through lines 38 and 43 can be introduced, if desired into the space 48 in a manner such that the rate and pressure drop do not vary with the position of the surface level 44.

In the operation described in connection with Figures 1 and 2, any suitable gas can be used for introduction through the line 17 and through the line 18. Preferably the gas is inert relative to the granular solids employed. Suitable gases include steam, flue gas from a catalytic regeneration process, etc. The gas introduced through line 17 can have the same general composition as, or different composition from the gas introduced through line 18.

In operation according to the present invention, a stream of gas is introduced into a contacting vessel through a line such as the lines 17 and 38 in such manner that the pressure in the line varies with the back pressure created by varying height of the compact bed within the vessel. This requires that the gas stream be supplied to the line at a substantially constant rate of flow even against a substantial back pressure, so that the back pressure increases the pressure in the line, rather than merely decreasing the rate of flow therethrough.

The invention claimed is:

1. Method for automatically controlling the upper surface level of a moving compact bed of granular solids, to the top of which granular solids are supplied, and from the bottom of which granular solids are withdrawn which comprises: gravitating granular solids as a compact mass through a restricted orifice in an upper zone; gravitating solids beneath said orifice as a falling stream onto the top of said moving compact bed in a lower zone; introducing a first stream of gas into said lower zone at a level not substantially above the upper surface of said compact bed, the pressure drop undergone by said first stream during such introduction increasing when the vertical distance of the upper surface of said compact bed above a predetermined level increases, and said pressure drop decreasing when said vertical distance decreases; passing a second stream of gas into said compact mass in said upper zone and downwardly therewith through said orifice; varying the flow rate of said second stream in accordance with said pressure drop, decreasing said flow rate of said second stream and therefore decreasing the flow rate of solids through said orifice when said pressure drop increases, and increasing said flow rate of said second stream and therefore increasing the flow rate of solids through said orifice when said pressure drop decreases.

2. Method according to claim 1 wherein said first stream is introduced into said moving compact bed at a level below the surface thereof and passed upwardly to and through said surface.

3. Method according to claim 1 wherein said first stream is introduced through a constricted gas space into a space adjacent and above said surface, and wherein the vertical distance of said surface above said predetermined level determines the area provided for gas flow through said constricted gas space, said area decreasing when said vertical distance increases and increasing when said vertical distance decreases.

4. In a method for selectively removing relatively fine granular solids from a mixture of such solids with relatively coarse solids, which method comprises gravitating granular solids as a falling stream through an entraining zone and onto the upper surface of a moving compact bed, and passing entraining gas upwardly through said entraining zone countercurrent to said falling stream to selectively entrain the relatively fine solids therein, the improvement, enabling control of the vertical level of said upper surface, which comprises: gravitating granular solids as a compact mass through a restricted orifice in an upper zone, the solids then gravitating as said falling stream beneath said orifice and onto said upper surface of said moving compact bed in a lower zone; introducing a first stream of gas into said lower zone at a level not substantially above the upper surface of said compact bed, the pressure drop undergone by said first stream during such introduction increasing when the vertical distance of the upper surface of said compact bed above a predetermined level increases, and said pressure drop decreasing when said vertical distance decreases, said first stream then passing upwardly through said entraining zone as said entraining gas; passing a second stream of gas into said compact mass in said upper zone and downwardly therewith through said orifice; varying the flow rate of said second stream in accordance with said pressure drop, decreasing said flow rate of said second stream and therefore decreasing the flow rate of solids through said orifice when said pressure drop increases, and increasing said flow rate of said second stream and therefore increasing the flow rate of solids through said orifice when said pressure drop decreases.

5. In a method for converting hydrocarbon material which comprises gravitating granular solids through a conversion zone as a falling stream and onto the upper surface of a moving compact bed, and contacting said falling stream with hydrocarbon material to effect conversion of the latter, the improvement, enabling control of the vertical level of said upper surface, which comprises: gravitating granular solids as a compact mass through a restricted orifice in an upper zone, the solids then gravitating beneath said orifice as said falling stream onto said upper surface of said moving compact bed in a lower zone; introducing a first stream of gas into said lower zone at a level not substantially above the upper surface of said compact bed, the pressure drop undergone by said first stream during such introduction increasing when the vertical distance of the upper surface of said compact bed above a predetermined level increases, and said pressure drop decreasing when said vertical distance decreases, said first stream then passing upwardly through said conversion zone; passing a second stream of gas into said upper zone and downwardly therewith through said orifice; varying the flow rate of said second stream in accordance with said pressure drop, decreasing said flow rate of said second stream and therefore decreasing the flow rate of solids through said orifice when said pressure drop increases, and increasing said flow rate of said second stream and therefore increasing the flow rate of solids through said orifice when said pressure drop decreases.

6. Apparatus for automatically controlling the level of the upper surface of a moving compact bed of granular solids gravitating through a chamber having an upper outlet for gas and a lower inlet for gas and a lower outlet for granular solids which comprises: a housing positioned above said chamber and having an upper solids inlet and a lower constricted outlet communicating with an upper solids inlet to said chamber; said lower inlet for gas being positioned beneath said inlet to said chamber; a gas conduit communicating with said lower inlet for gas; means for introducing gas through said gas conduit into said chamber; a second gas conduit communicating with said housing; and a gas flow rate controller communicating with said second gas conduit and with the first-named gas conduit and adapted to increase the gas flow rate through said second gas conduit when the pressure in said first-named gas conduit decreases and to decrease the gas flow rate through said second gas conduit when the pressure in said first-named gas conduit increases.

7. In apparatus for selectively removing relatively fine granular solids from a mixture of such solids with relatively coarse solids, which apparatus comprises an elongated elutriating chamber adapted for contact of falling granular solids with a rising gas stream, said chamber having an upper outlet for gas and a lower inlet for gas and a lower outlet for granular solids, a housing positioned above said chamber and having an upper solids inlet and a lower constricted outlet communicating with an upper solids inlet to said chamber, said lower inlet for gas being positioned beneath said inlet to said chamber and a gas conduit communicating with said lower inlet for gas, the improvement which comprises: a second gas conduit communicating with said housing; a gas flow rate controller communicating with said second gas conduit and with the first-named gas conduit and adapted to increase the gas flow rate through said second gas conduit when the pressure in said first-named gas conduit decreases and to decrease the gas flow rate through said second gas conduit when the pressure in said first-named gas conduit increases.

8. In apparatus for converting hydrocarbon material by contact with granular solid contact material, which apparatus comprises a conversion chamber having an upper outlet for gas and a lower inlet for gas and a lower outlet for granular solids, means for introducing hydrocarbon material into said conversion chamber, a housing positioned above said chamber and having a lower constricted outlet communicating with an upper solids inlet to said chamber, said lower inlet for gas being positioned beneath said inlet to said chamber and a gas conduit communicating with said lower inlet for gas, the improvement which comprises: a second gas conduit communicating with said housing; a gas flow rate controller communicating with said second gas conduit and with the first-named gas conduit and adapted to increase the gas flow rate through said second gas conduit when the pressure in said first-named gas conduit decreases and to decrease the gas flow rate through said second gas conduit when the pressure in said first-named gas conduit increases; and an atomizer positioned within said chamber and adapted to spray hydrocarbon material downwardly and laterally.

References Cited in the file of this patent

UNITED STATES PATENTS

| 2,331,208 | Ludi | Oct. 5, 1943 |
| 2,446,786 | Redhead | Aug. 10, 1948 |
| 2,458,162 | Hagerbaumer | Jan. 4, 1949 |
| 2,517,451 | Sorteberg | Aug. 1, 1950 |
| 2,556,514 | Bergstrom | June 12, 1951 |
| 2,623,793 | Hill | Dec. 30, 1952 |

OTHER REFERENCES

"Measurement of Solids in T. C. D. Process," Kelly, The Petroleum Engineer, September 1945, pp. 136, 138 and 142. (Copy in 196/132.)